US008671098B2

(12) United States Patent
Salvetti et al.

(10) Patent No.: US 8,671,098 B2
(45) Date of Patent: Mar. 11, 2014

(54) AUTOMATIC GENERATION OF DIGITAL COMPOSITE PRODUCT REVIEWS

(75) Inventors: Franco Salvetti, San Francisco, CA (US); Livia Polanyi, Palo Alto, CA (US)

(73) Assignee: Microsoft Corporation, Redmond, WA (US)

( * ) Notice: Subject to any disclaimer, the term of this patent is extended or adjusted under 35 U.S.C. 154(b) by 204 days.

(21) Appl. No.: 13/232,031

(22) Filed: Sep. 14, 2011

(65) Prior Publication Data

US 2013/0066873 A1 Mar. 14, 2013

(51) Int. Cl.
*G06F 17/30* (2006.01)

(52) U.S. Cl.
USPC .................................. 707/738; 707/E17.009

(58) Field of Classification Search
None
See application file for complete search history.

(56) References Cited

U.S. PATENT DOCUMENTS

| | | | |
|---|---|---|---|
| 7,788,087 | B2 | 8/2010 | Corston-Oliver et al. |
| 7,962,461 | B2 | 6/2011 | Ruhl et al. |
| 2007/0282867 | A1 | 12/2007 | McAllister et al. |
| 2008/0215571 | A1 | 9/2008 | Huang et al. |
| 2009/0193011 | A1 | 7/2009 | Blair-Goldensohn et al. |
| 2009/0265307 | A1 | 10/2009 | Reisman et al. |
| 2009/0319342 | A1 | 12/2009 | Shilman et al. |
| 2010/0049590 | A1 | 2/2010 | Anshul |

OTHER PUBLICATIONS

Liu et al., Dialogue-Oriented Review Summary Generation for Spoken Dialogue Recommendation Systems, North American Chapter of ACL, pp. 64-72, Los Angeles, California, Jun. 2010.*

Khang, Ly Duy., "Product Review Summarization from a Deeper Perspective", Retrieved at <<http://wing.comp.nus.edu.sg/publications/theses/2010/khangthesis2010.pdf>>, Proceedings of the 2011 Joint International Conference on Digital Libraries, Jun. 13-17, 2011, pp. 46.

Hu, et al., "Mining and Summarizing Customer Reviews", Retrieved at <<http://www.cs.uiuc.edu/class/fa05/cs591han/kdd04/docs/p168.pdf>>, Proceedings of the tenth ACM SIGKDD international conference on Knowledge discovery and data mining, Aug. 22-25, 2004, pp. 168-177.

Kokkoras, et al., "Summarization of Multiple, Metadata Rich, Product Reviews", Retrieved at <<http://mlkd.csd.auth.gr/publication_details.asp?publicationID=325>>, Workshop on Mining Social Data 18th European Conference on Artificial Intelligence, 2008, pp. 5.

"Anatomy of a Bing caption", Retrieved at <<http://www.bing.com/community/site_blogs/b/webmaster/archive/2010/10/25/anatomy-of-a-bing-caption.aspx>>, Oct. 25, 2010, pp. 3.

(Continued)

*Primary Examiner* — Anteneh Girma
(74) *Attorney, Agent, or Firm* — Dave Ream; Jim Ross; Micky Minhas (57) ABSTRACT

Consumers receive module-computed composite reviews that are lively, informative, coherent, and representative of a larger underlying collection of reviews. Representative phrases from reviews are extracted and aggregated into coherent sentences to create the composite review. Clear automatable criteria are provided to define coherence and other qualities, such as representativeness, liveliness, and informativity. Sentence coherence criteria involve syntax, shared vocabulary, phrase connectors, and phrase sentiment polarity, for instance. Phrase representativeness criteria involve review ratings and derived phrase ratings, for instance. Phrase liveliness criteria involve sentiment expression frequency, superlatives, comparatives, degree modifiers, affect activation scores, and affect imagery scores, for instance. Phrase informativity criteria involve product-specific words, review length, and recency, for instance. Prohibited language is filtered out. Composite reviews are automatically distributed, e.g., in response to a web search on the reviewed product. Reviews can be generated with a repeatability and rapidity not attainable by human performance alone.

20 Claims, 3 Drawing Sheets

(56) References Cited

OTHER PUBLICATIONS

Cynthia Whissell, "Whissell's Dictionary of Affect in Language: Technical Manual and User's Guide", Retrieved at http://www.cs.columbia.edu/~julia/papers/dict_of_affect/DictofAffectinLang.README.pdf>>, no later than Jul. 16, 2011, pp. 6.

Daniel Jurafsky et al., "Speech and Language Processing: An Introduction to Speech Recognition, Computational Linguistics and Natural Language Processing: Second Edition, Chapter 12: Formal Grammars of English", Retrieved at <<gladtosee.tistory.com/attachment/dk010000000004.pdf>>, Jul. 8, 2007, pp. 44.

Minqing Hu et al., "Mining and Summarizing Customer Reviews", Retrieved at <<www.cs.uic.edu/~liub/publications/kdd04-revSummary.pdf>>, Aug. 22-25, 2004, pp. 168-177.

"Internet General Inquirer", Retrieved at <<http://www.webuse.umd.edu:9090/>>, no later than Sep. 8, 2011, pp. 2.

Lane R. Ellis, "Microsoft Buys Semantic Search Specialist Powerset", Retrieved at <<http://www.searchengineworld.com/microsoft/3458014.htm>>, Jul. 2, 2008, pp. 3.

"MPQA Releases—Corpus and Opinion Recogntion System", Retrieved at <<http://www.cs.pitt.edu/mpqa/>>, no later than Sep. 8, 2011, pp. 2.

"Powerset (company)", Retrieved at <<http://en.wikipedia.org/wiki/Powerset_(company)>>, Jun. 8, 2011, pp. 3.

"Review", Retrieved at <<http://en.wikipedia.org/wiki/Product_review, Jul. 26, 2011, pp. 3.

Andrea Esuli et al., "SentiWordNet: A Publicly Available Lexical Resource for Opinion Mining", Retrieved at <<http://research.microsoft.com/apps/pubs/default.aspx?id=65457>>, 2006, pp. 1.

Scott A. Waterman, "Distributed Parse Mining", Retrieved at <<aclweb.org/anthology-new/W/W09/W09-1510.pdf>>, 2009, pp. 56-64.

* cited by examiner

AUTOMATIC GENERATION OF DIGITAL COMPOSITE PRODUCT REVIEWS

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Products and services are often discussed in public reviews, online and in other media. Reviews are typically written by professional critics, by experts, and/or by ordinary consumers. Reviews often discuss particular features of a reviewed item, and provide the reviewer's subjective opinions regarding the item (product or service) and its features. A rating may be given as part of a review, to indicate an item's relative merit, e.g., by giving the reviewed item three stars within a range from zero stars (worst) to five stars (best). Reviews may be unpaid, or the reviewer may be compensated for providing the review.

In electronic commerce, product reviews are often provided on shopping sites to give consumers a chance to rate and comment on products they have purchased. Such reviews are often published near or on the web page(s) that offer the reviewed product. Other consumers can read these reviews when considering items for purchase. When several reviews have been given, an overall rating based on the individual ratings can be automatically calculated and displayed on the product page. Reviews may be anonymous, semi-anonymous (associated only with a screen name or user name), or attributed to a person whose offline name is given.

SUMMARY

Consumers rely on published reviews of services and products when considering "purchasing" an item (be it a rental, subscription, lease, outright sale, or other purchase). For a given item, the World Wide Web and other online sources often contain dozens, hundreds, or even thousands of reviews which have been written and submitted by human reviewers. Automatic rankings, review snippets, and other mechanisms are used in attempts to make this enormous amount of information useful in a timely manner at reasonable cost, with varying degrees of success. In practice, review information can be summarized, quoted, or otherwise presented in many different ways, subject to many different criteria and with varying levels of timeliness, human effort, and consistency in the results.

Some embodiments described herein help consistently, promptly, and cost-effectively provide composite reviews that are lively, informative, coherent, and representative of a larger underlying collection of reviews. Objective criteria are provided here for assessing the representativeness, coherence, liveliness, and informativity of a composite review, thereby supporting both flexibility of the embodiments overall and consistency of results within a given embodiment. The objective criteria are also implementable by full automation, making possible the consistent creation of composite reviews even when the composite review is drawn from such a large amount of underlying review data within such a short time that comparable human efforts are not feasible.

Some embodiments computationally analyze dozens of product reviews to create a multiphrase composite product review containing selected extracts. Review texts are automatically scanned, and lexically and semantically analyzed. Creation of a composite review is accomplished without requiring any selection of review extracts by human reader(s), thereby making possible a uniformity of extract selection, a breadth and promptness of composite review distribution, and a rapidity and reliability of composite review creation which are not feasible by mental steps alone.

Some embodiments electronically access a source collection of product reviews. Each product review contains at least a digital text; images may also be present. Embodiments automatically select representative phrases from the digital texts of at least some of the product reviews, with each representative phrase being an extract of (that is, coming from) at least one of the product reviews' digital text.

Some embodiments automatically aggregate at least some of the selected representative phrases into one or more coherent sentences, thereby creating the multiphrase composite product review. Some embodiments use templates which have slots; some use grammatical, syntactic, and/or other constraints. Different phrases in the composite review may have different qualities, or may share qualities, such as representativeness, liveliness, and informativity. For example, in some composite reviews a first phrase has the representativeness quality, a second phrase has the liveliness quality, and a third phrase has the informativity quality. After creating the composite review, some embodiments automatically distribute the composite review over a computer network.

In some embodiments, a sentence in the multiphrase composite product review created in the aggregating step is considered "coherent" when particular specified coherence condition(s) are satisfied, and/or when at least a number (in the range from one to the number of coherence conditions) of coherence conditions is satisfied. Some coherence conditions include: the sentence is syntactically well-formed, as determined by a natural language parser; all extracted phrases in the sentence are syntactically congruent with one another, namely, they have the same or compatible phrase types as determined by a natural language parser; the sentence contains no pronouns; the extracted phrases in the sentence have no shared vocabulary of nouns, verbs, adjectives, or adverbs with one another; the extracted phrases in the sentence have none of the following connectors: "but", "although", "however", "except", "also", "in addition", "moreover", "if" (the sentence overall may contain these or other connectors to connect the extracted phrases); the sentence connects phrases of opposing polarity only with a connection phrase that contains at least one of the following connectors: "but", "although", "however", "except"; the sentence connects phrases of non-opposing polarity only with a comma or with a connection phrase that contains at least one of the following connectors: "also", "in addition", "moreover", "and".

What is "representative" depends on one or more definitions, whose applicability may vary between embodiments. In some cases, a phrase is by definition deemed to be a representative phrase when the phrase comes from a product review which has a star rating within thirty percent of an overall star rating of the source collection. In some, a phrase is by definition deemed to be a representative phrase when a star rating of the phrase derived from a balance between positive and negative sentiments in the phrase is within thirty percent of a star rating of the product review the phrase comes from. In some cases, all representative phrases (phrases categorized as representative) in the composite product review are by definition deemed to be representative phrases (have been categorized as such) when a balance between positive and negative sentiments in the composite product review is within thirty percent of a balance between positive and negative sentiments in the source collection. The foregoing definitions are nonexclusive of each other, in that one or more may be met by a given phrase. Any one of the definitions is sufficient for a phrase to be deemed representative if that definition is among the definition(s) applied in a given embodiment.

In some embodiments, at least one automatically selected representative phrase comes from a product review which has a star rating within thirty percent of an overall star rating of the source collection. In some, at least one (other) automatically selected representative phrase has a derived star rating within thirty percent of a star rating of the product review the phrase comes from.

In some embodiments, selected representative phrases in the multiphrase composite product review are also each a lively phrase. In some, a phrase is deemed "lively" when particular specified liveliness condition(s) are satisfied, and/or when a specified number of liveliness conditions is satisfied. Some liveliness conditions are: the phrase contains at least one superlative word; the phrase contains at least one comparative word; the phrase contains at least one degree modifier word; the phrase contains a sentiment expression having a frequency in the bottom twenty percent of a frequency table which lists relative frequency for at least one hundred sentiment expressions; at least one word in the phrase has an above-average imagery score based on a dictionary of affect in language; at least one word in the phrase has an above-average activation score based on a dictionary of affect in language; the phrase contains at least a two non-neutral sentiment words; at least a one-third of the words in the phrase are non-neutral sentiment words.

In some embodiments, selected representative phrases in the multiphrase composite product review are also each an informative phrase. In some, a phrase is deemed "informative" when particular specified informativity condition(s) are satisfied, and/or when a specified number of informativity conditions is satisfied. Some informativity conditions are: the phrase contains at least two product words from a list of product words for a product category containing the product review; the phrase comes from a review which is no more than two weeks old; the phrase comes from a review whose length is within one standard deviation of the mean length of the product reviews in the source collection; the phrase comes from a review which has previously been identified by a human reader as a helpful review.

As an example which is believed not capable of performance by normal human mental processes and hence a specific technical application, some embodiments (a) automatically scan at least twenty product reviews, and (b) electronically distribute the multiphrase composite product review over a computer network after the aggregating step, with the scanning, selecting, aggregating, and distributing steps within less than three minutes. As another such example, some embodiments repeat actions noted above at least one hundred times for at least one hundred different reviewed products, thereby creating at least one hundred different multiphrase composite product reviews, within less than one hour. As another such example, some embodiments repeat actions noted above at least one thousand times, thereby creating at least one thousand multiphrase composite product reviews, within less than ten hours.

In some embodiments, the multiphrase composite product review is brief in that the length in words of the multiphrase composite product review is no more than one half of the combined lengths of the digital texts of the product reviews from which the representative phrases were extracted. In some, phrases of the multiphrase composite review are extracted from at least six different source reviews, and the source collection contains at least one hundred source reviews. Of course other number of reviews may be used as well in a given embodiment.

Some embodiments filter out prohibited language, such that prohibited language appearing in a scanned product review does not appear in the multiphrase composite product review. Prohibited language may be specified in a blacklist, and may include, for instance, profanity, sexually explicit language, website or email addresses (particular instances and/or as syntactic categories), celebrity names, and other potentially problematic language.

Some embodiments include at least one logical processor, a computer-readable storage medium in operable communication with the logical processor, and composite review modules configuring the medium. Each composite review module is operably connected for data transfer to at least one other composite review module. The composite review modules may include, for example, a sentence coherence module having a set of connector words, a product review module having access to a source collection of source reviews containing digital texts, and an aggregating module. The aggregating module has code which upon execution by the logical processor(s) will automatically create a multiphrase composite review that contains at least one coherent sentence of connected phrases from the source review texts.

In some embodiments, the composite review modules include a sentiment phrase liveliness scoring module that has access to a dictionary of affect in language. The dictionary of affect in language includes imagery scores and activation scores. The aggregating module operates with the liveliness scoring module to place lively phrases (based on an imagery score, an activation score, or both) in the composite review.

In some embodiments, the composite review modules include a sentiment phrase informativity scoring module that has a list of informative words. The aggregating module operates with the informativity scoring module to place informative phrases (based on the informative words) in the composite review.

In some embodiments, the composite review modules include a sentiment phrase representativeness scoring module that has access to star ratings. The aggregating module operates with the representativeness scoring module to place representative phrases (based on the star ratings) in the composite review.

Some embodiments include the multiphrase composite review residing in the medium, as well as the medium containing it. In some, phrases of the multiphrase composite review have a respective polarity. In some such embodiments, the connector words include a first list which contains at least the connector words that connect phrases of opposing polarity in the composite review, and the connector words also include a second list which contains at least the connector words that connect phrases of non-opposing polarity in the multiphrase composite review.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Consumers and other online users increasingly rely on reviews of services and products. Reviews are submitted to websites by both amateur and professional reviewers. When users visit these sites they encounter scores or even thousands of reviews and, since they cannot humanly read and process so many texts, some sites automatically compress the information in these reviews by surfacing (displaying) to the user (i) key phrases extracted from some documents, (ii) a visualization of ratings assigned to aspects of the product or service, or (iii) one or more partial reviews. Search engines which do not own the content of the reviews often display the beginning(s) of one or more reviews that are judged to be "typical" or "good" according to some internal search engine measure, up to a limited screen real estate allocation or a perceived copyright fair use limit of at most a few hundred characters.

Review sites sometimes employ human editors who create composite reviews manually, by reading through collected reviews, choosing phrasing that strikes them at the time as interesting and pertinent to a reviewed product, and then assembling sentences that use the chosen phrasing. Given the same collection of reviews a few days later, one would expect a human editor to choose somewhat different phrasing and produce a different result, because people are not automatons. Likewise, different human editors would normally make different choices and produce different results even when given the same collection of reviews. The set of criteria actually used by human editors, and the manner in which criteria are applied, is unknown and is not necessarily well-defined.

Reasonable people will also recognize that there are practical limits on what human editors can do, in terms of how many reviews they can read while looking for phrasing and how fast they can do that reading and assemble their selections into more-or-less grammatical sentences. In general, at some point there is a qualitative difference between human and automated capabilities. One may assert that human mental steps alone can do anything involving data. For instance, one may assert that a person with nothing more than a good memory could remember—and produce as requested—the content of every issued United States patent. But in practice no such person is known to exist. Such memory capability is so far beyond human reach that society is better off encouraging the development of practical technological approaches to patent content storage, than it would be pretending that such a prodigious human memory will become available anytime in the foreseeable future. Hence, society beneficially pursues and uses technological information storage and processing, ranging from very simple technology such as a pencil and paper, to a multimillion dollar information technology infrastructure such as that used by the USPTO.

Some embodiments described here provide practical advances beyond mere human capabilities, including advances in the amount of review texts being scanned, the rapidity of that scanning and utilization, the clarity and consistent application of criteria for selecting phrases from review texts, and the use of discrete well-defined criteria for sentence coherence and for phrase qualities (representativeness, liveliness, informativity), for example.

Some embodiments employ semantic analysis using linguistic processing to produce a lively composite review for an item from a set of reviews for that item. Comments about aspects of a product containing evaluative language (e.g., sentiment-bearing terms with a positive or negative connotation) are automatically identified in different reviews written by different reviewers, using natural language methods. The liveliness or interest level of the extracted comments is determined automatically, and templates or full-scale natural language generation techniques are used to assemble these comments into a composite review that is linguistically coherent and readable, and that reflects the overall rating of the product. The language of the users' reviews is highlighted in the composite review, e.g., by quotes or by visual highlighting via background colors or font differences. In some embodiments individual extracted comments can be selected by the reader for an easy click-through to the original review text. The information density of the composite review is very high, since only relevant evaluative information and crucial features are included.

For example, one generated composite review reads as follows: This "excellent SLR" is "a very good camera", "a great starter", even if "buttons can be tricky" it is "by far the best camera"—"easy to use" with "excellent resolution" and "nice balance of features".

In some embodiments, product reviews are analyzed using natural language technology to identify and extract sentiment-bearing phrases and grammatically well-formed linguistic phrases (Adj-Noun, Verb-Adj, Verb-Adv, etc.). The liveliness of the phrasing of the extracted comment may be evaluated. The most lively and interesting phrasings are selected, whether an evaluation or ranking of comments is done or not. A composite sentence using one or more phrases is created as part of readable, well-formed, interesting composite remarks, using either (i) template-based methods of sentence generation with a sentence frame containing one or more phrases and one or more slots that can only be filled by phrases of the syntactically appropriate type, or (ii) full natural language generation techniques. Some embodiments identify key sentiments, extract the most interesting representative phrases from the documents, and aggregate the phrases into coherent sentences to generate a comprehensive product review. For web search queries that produce a product review or a collection of product reviews, some embodiments employ chunking (e.g., generation of Noun-Phrase/Verb-Phrase phrases) along with sentiment analysis (e.g., positive vs. negative chunks) and linguistic templates to generate a composite highly informative review which preserves overall opinion polarity and emotional intensity while increasing information density.

Some embodiments described herein may be viewed in a broader context. For instance, concepts such as product reviews, sentences, phrases, ratings, polarity, links, and liveliness may be relevant to a particular embodiment. However, it does not follow from the availability of a broad context that exclusive rights are being sought herein for abstract ideas; they are not. Rather, the present disclosure is focused on providing appropriately specific embodiments. Other media, systems, and processes involving product reviews, sentences, phrases, ratings, polarity, links, and/or liveliness are outside the present scope. Accordingly, vagueness and accompanying proof problems are also avoided under a proper understanding of the present disclosure.

Reference will now be made to exemplary embodiments such as those illustrated in the drawings, and specific language will be used herein to describe the same. But alterations and further modifications of the features illustrated herein, and additional applications of the principles illustrated herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage, in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise their right to their own lexicography. Terms may be defined, either explicitly or implicitly, here in the Detailed Description and/or elsewhere in the application file.

As used herein, a "computer system" may include, for example, one or more servers, motherboards, processing nodes, personal computers (portable or not), personal digital assistants, cell or mobile phones, other mobile devices having at least a processor and a memory, and/or other device(s) providing one or more processors controlled at least in part by instructions. The instructions may be in the form of firmware or other software in memory and/or specialized circuitry. In particular, although it may occur that many embodiments run on workstation or laptop computers, other embodiments may run on other computing devices, and any one or more such devices may be part of a given embodiment.

A "multithreaded" computer system is a computer system which supports multiple execution threads. The term "thread" should be understood to include any code capable of or subject to scheduling (and possibly to synchronization), and may also be known by another name, such as "task," "process," or "coroutine," for example. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread-processing unit, such as a core in a simultaneous multithreading implementation. As another example, a hyperthreaded quad core chip running two threads per core has eight logical processors. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

"Kernels" include operating systems, hypervisors, virtual machines, BIOS code, and similar hardware interface software.

"Code" means processor instructions, data (which includes constants, variables, and data structures), or both instructions and data.

"Program" is used broadly herein, to include applications, kernels, drivers, interrupt handlers, libraries, and other code written by programmers (who are also referred to as developers).

"Automatically" means by use of automation (e.g., general purpose computing hardware configured by software for specific operations discussed herein), as opposed to without automation. In particular, steps performed "automatically" are not performed by hand on paper or in a person's mind; they are performed with a machine. However, "automatically" does not necessarily mean "immediately".

"Computationally" means a computing device (processor plus memory, at least) is being used, and excludes obtaining a computational result by mere human thought or mere human action alone. For example, doing arithmetic with a paper and pencil is not doing arithmetic computationally as understood herein.

"Coherent" and related terms such as "coherence" have the meaning ascribed by whatever coherence conditions are applicable in a particular embodiment, namely, the coherence conditions which are expressly recited for the embodiment.

"Representative" and related terms such as "representativeness" have the meaning ascribed by whatever representativeness definitions are applicable in a particular embodiment, namely, the definitions which are expressly recited for the embodiment.

"Lively" and related terms such as "liveliness" have the meaning ascribed by whatever liveliness conditions are applicable in a particular embodiment, namely, the liveliness conditions which are expressly recited for the embodiment.

"Informative" and related terms such as "informativity" have the meaning ascribed by whatever informativity conditions are applicable in a particular embodiment, namely, the informativity conditions which are expressly recited for the embodiment.

"Star rating" means any rating or ranking which assigns a numeric and/or enumerated value. Although star ratings in a range from zero stars to five stars provide one example, many other examples also exist. The range can be zero to four, one to ten, zero percent to one hundred percent, or an enumerated range such as (extremely unhappy, unhappy, neutral, happy, very happy), for example. Star graphics can be used, but so can almost any other graphic, e.g., boxes of popcorn, thumbs up, smiley faces, or indeed, no graphic at all. Some star ratings are calculated routinely for reviews within a commerce site, while others are derived as discussed herein and pertain to individual phrases rather than entire reviews or review collections.

Throughout this document, use of the optional plural "(s)", "(es)", or "(ies)" means that one or more of the indicated feature is present. For example, "phrase(s)" means "one or more phrases" or equivalently "at least one phrase".

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as accessing, aggregating, coming from, containing, creating, determining, distributing, extracting, filtering, having, identifying, including, listing, operating, performing, placing, repeating, residing, satisfying, scanning, scoring, and selecting, and related words such as accesses, accessed, aggregates, aggregated, etc., with regard to a destination or other subject may involve intervening action such as forwarding, copying, uploading, downloading, encoding, decoding, compressing, decompressing, encrypting, decrypting, authenticating, invoking, and so on by some other party, yet still be understood as being performed directly by the party of interest.

Whenever reference is made to data or instructions, it is understood that these items configure a computer-readable memory thereby transforming it to a particular article, as opposed to simply existing on paper, in a person's mind, or as a signal on a wire, for example. Memory 112 doesn't include a signal per se.

Operating Environments

Figure 1:
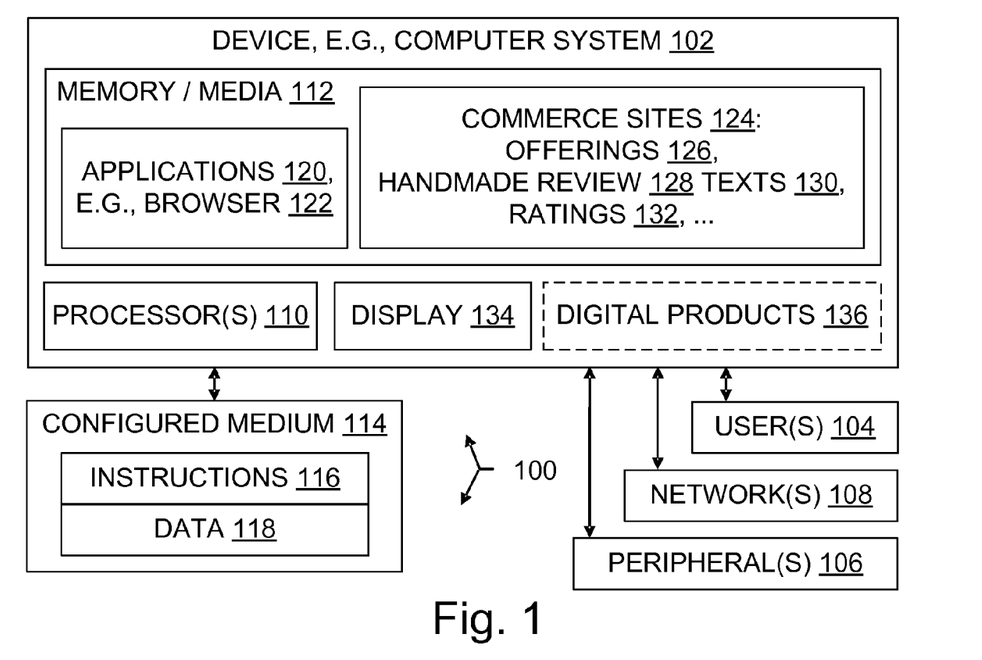
FIG. 1 is a block diagram illustrating a computer system having at least one processor, at least one memory, at least one browser or other application for viewing reviews, and other items in an operating environment which may be present on multiple network nodes, and also illustrating configured storage medium embodiments.

With reference to FIG. 1, an operating environment 100 for an embodiment may include a computer system 102. The computer system 102 may be a multiprocessor computer system, or not. An operating environment may include one or more machines in a given computer system, which may be clustered, client-server networked, and/or peer-to-peer networked. An individual machine is a computer system, and a group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106. System administrators, developers, engineers, and end-users are each a particular type of user 104. Automated agents acting on behalf of one or more people may also be users 104. Storage devices and/or networking devices may be considered peripheral equipment in some embodiments. Other computer systems not shown in FIG. 1 may interact with the computer system 102 or with another system embodiment using one or more connections to a network 108 via network interface equipment, for example.

The computer system 102 includes at least one logical processor 110. The computer system 102, like other suitable systems, also includes one or more computer-readable storage media 112. Storage media 112 may be of different physical types. The storage media 112 may be volatile memory, non-volatile memory, fixed in place media, removable media, magnetic media, and/or optical media, as opposed to media such as a wire that merely propagates a signal. In particular, a configured medium 114 such as a CD, DVD, memory stick, or other removable non-volatile memory medium may become functionally part of the computer system when inserted or otherwise installed, making its content accessible for use by processor 110. The removable configured medium 114 is an example of a computer-readable storage medium 112. Some other examples of computer-readable storage media 112 include built-in RAM, ROM, hard disks, and other storage devices which are not readily removable by users 104.

The medium 114 is configured with instructions 116 that are executable by a processor 110; "executable" is used in a broad sense herein to include machine code, interpretable code, and code that runs on a virtual machine, for example. The medium 114 is also configured with data 118 which is created, modified, referenced, and/or otherwise used by execution of the instructions 116. The instructions 116 and the data 118 configure the medium 114 in which they reside; when that memory is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by extraction, selection, scoring, aggregation, and other activities as discussed herein.

Applications 120 such as email managers and a web browser 122, as well as partial copies of commerce sites 124 accessed through the browser 122, other software, and other items shown in the Figures and/or discussed in the text may reside partially or entirely within one or more media 112, thereby configuring those media. "Commerce sites" refer to any site offering any reviewed product and/or service, whether offered for free or at some cost. The reviewed products and/or services are offerings 126, with associated handmade (as opposed to automation-originated) reviews 128 written by consumers, experts, marketers, and/or other people. The reviews 128 contain text 130, may contain images or sound recordings or video clips, and may have associated ratings 132. Commerce sites 124 and their handmade reviews 128 are familiar to browser users 104. Reviews 128 are shown to users on a display 134. In addition to the display, an operating environment may also include other hardware, such as buses, power supplies, and accelerators, for instance. Purchased products 136 in digital formats (software, image files, sound files, movies, and so on) may also be present.

One or more items are shown in outline form in FIG. 1 to emphasize that they are not necessarily part of the illustrated operating environment, but may interoperate with items in the operating environment as discussed herein. It does not follow that items not in outline form are necessarily required, in any Figure or any embodiment.

Systems

Figure 2:
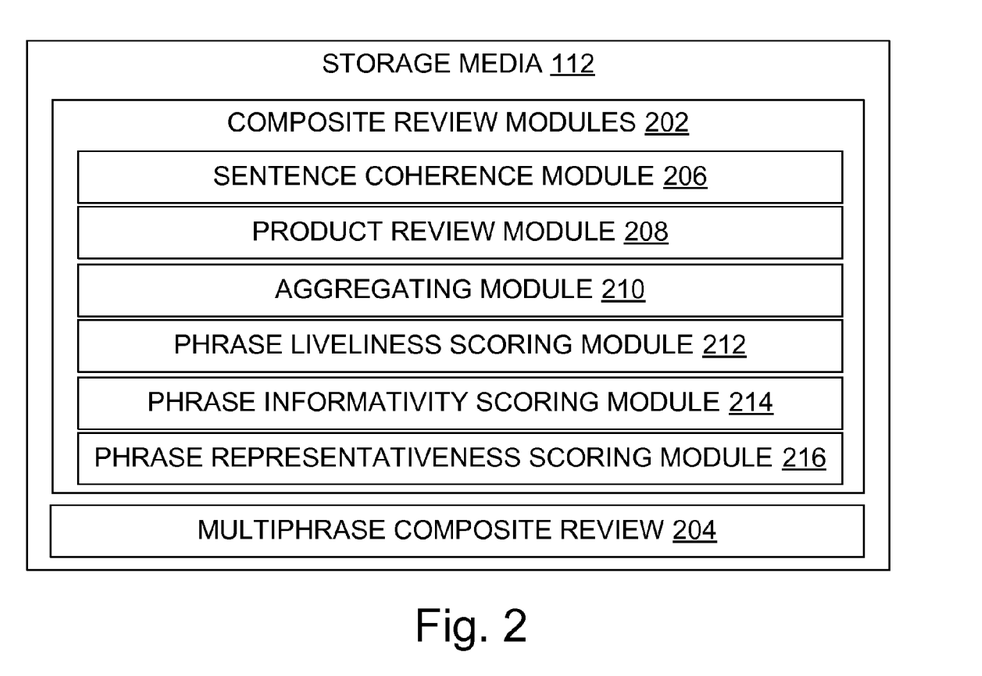
FIG. 2 is a block diagram illustrating aspects of composite review generation in an example architecture.

FIG. 2 illustrates an architecture which is suitable for use with some embodiments. Composite review modules 202 contain logic (computing hardware interoperating with software code) for creating multiphrase composite reviews 204. For example, a sentence coherence module 206 contains logic for generating a sentence which is coherent according to specified automated criteria, and/or for testing the coherence of a given sentence according to such criteria. A product review module 208 contains logic for accessing a collection of handmade reviews 128. An aggregating module 210 contains logic for automatically creating a sentence (or multiple sentences, in some embodiments) by aggregating individual phrases excerpted from handmade reviews 128; the extraction may be performed by the aggregating module 210 using templates 410 and/or by other module(s) 202 in a given embodiment.

In the illustrated architecture, a phrase liveliness scoring module 212 contains logic for using a dictionary of affect in language to score a liveliness quality of a given phrase according to specified automated criteria. A phrase informativity scoring module 214 contains logic for using a list of product/service-related words to score an informativity quality of a given phrase according to specified automated criteria. A phrase representativeness scoring module 216 contains logic for using ratings to score a representativeness quality of a given phrase according to specified automated criteria.

Figure 3:
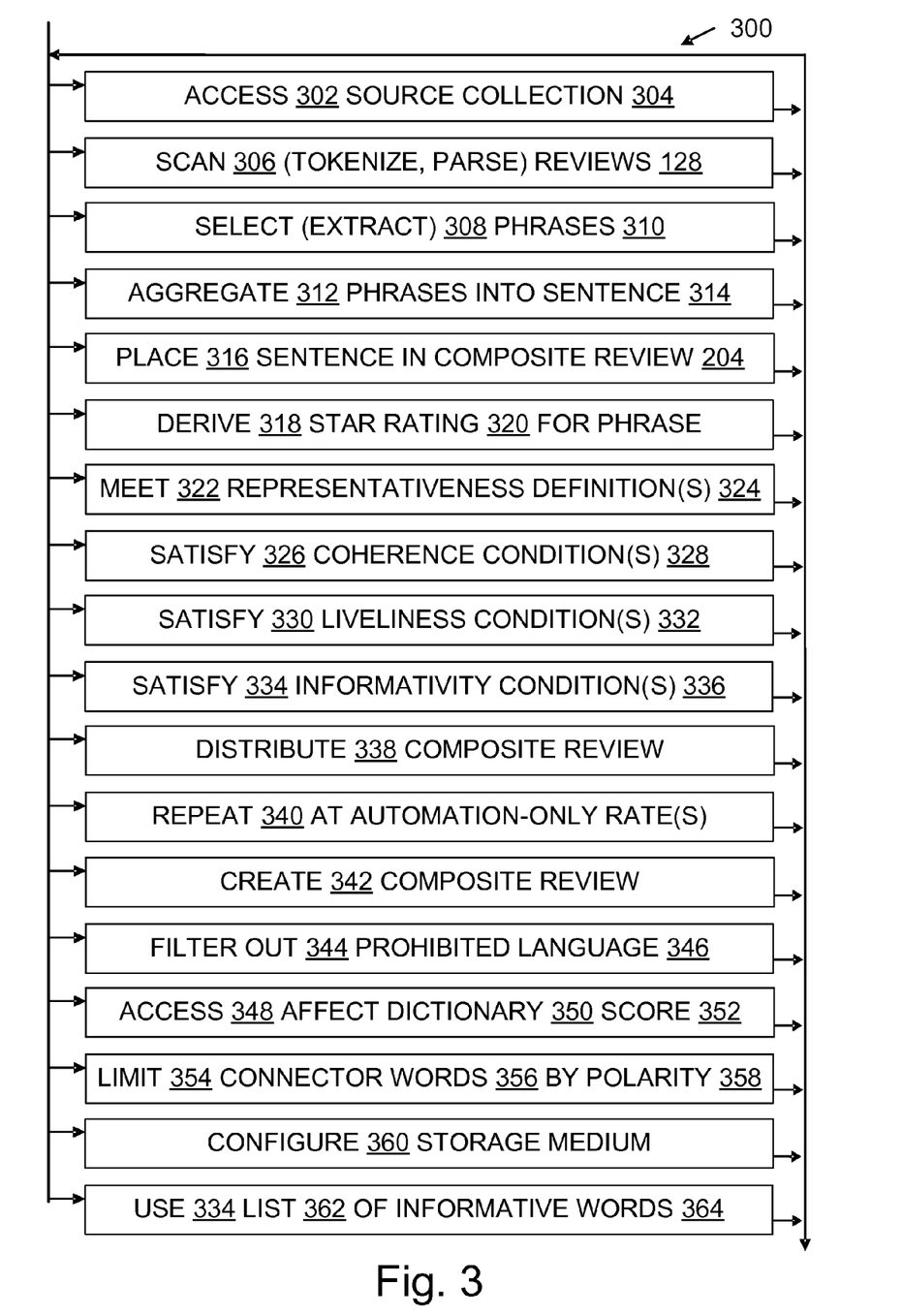
FIG. 3 is a flow chart illustrating steps of some process and configured storage medium embodiments.

With reference to FIGS. 1 through 3, some embodiments provide a computer system 102 with a logical processor 110 and a memory medium 112 configured by circuitry, firmware, and/or software to transform a collection of handmade reviews 128 into a composite review 204 in a reliable, uniform, and prompt manner as described herein.

Some embodiments provide a computer system 102 having at least one logical processor 110 and a computer-readable storage medium 112 in operable communication with the logical processor. The system includes composite review modules 202. A sentence coherence module 206 resides in the medium 112, and within its logic has a set of connector words 356. A product review module 208 resides in the medium 112 and has access to a source collection 304 of source reviews 128 which contain digital texts 130. An aggregating module 210 resides in the medium 112 and has code which upon execution by the logical processor(s) 110 will perform an automated process for creating a multiphrase composite review 204 which contains at least one coherent sentence of connected phrases from the source review texts. Each of the composite review modules 202 in the system is operably connected for data transfer to at least one other composite review module 202 of the system.

In some embodiments, the composite review modules 202 include a sentiment phrase liveliness scoring module 212 residing in the medium. The liveliness scoring module 212 has access to a dictionary 350 of affect in language, which includes imagery scores 352 and activation scores 352. The aggregating module 210 operates with the liveliness scoring module 212 to place lively phrases 310 (based on an imagery score, an activation score, or both) in the composite review 204.

In some embodiments, the composite review modules 202 include a sentiment phrase informativity scoring module 214 residing in the medium 112. The informativity scoring module 214 has a list 362 of informative words 364. The aggregating module 210 operates with the informativity scoring module 214 to place informative phrases 310 (based on the informative words 364) in the composite review 204.

In some embodiments, the composite review modules 202 include a sentiment phrase representativeness scoring module 216 residing in the medium 112. The phrase representativeness scoring module 216 has access to star ratings 320 such as ratings 132 and/or derived ratings 320. The aggregating module 210 operates with the representativeness scoring module 216 to place representative phrases 310 (based on the star ratings 320) in the composite review 204.

Some embodiments include a multiphrase composite review 204 residing in the medium, as well as the medium containing the review. In some of these embodiments, phrases 310 of the multiphrase composite review 204 have a respective polarity 358, connector words 356 include a first list which contains at least the connector words that connect phrases of opposing polarity in the composite review, and the connector words 356 also include a second list which contains at least the connector words that connect phrases of non-opposing polarity in the multiphrase composite review 204.

In some embodiments, phrases 310 of the multiphrase composite review 204 are extracted from at least a specified number (e.g., an integer from two to fifteen) different source reviews 128. In some, the source collection contains at least a specified number (e.g., an integer from ten to one thousand) source reviews 128.

In some embodiments peripherals 106 such as human user I/O devices (screen, keyboard, mouse, tablet, microphone, speaker, motion sensor, etc.) will be present in operable communication with one or more processors 110 and memory. However, an embodiment may also be deeply embedded in a system, such that no human user 104 interacts directly with the embodiment. Software processes may be users 104.

In some embodiments, the system includes multiple computers connected by a network. Networking interface equipment can provide access to networks 108, using components such as a packet-switched network interface card, a wireless transceiver, or a telephone network interface, for example, will be present in a computer system. However, an embodiment may also communicate through direct memory access, removable nonvolatile media, or other information storage-retrieval and/or transmission approaches, or an embodiment in a computer system may operate without communicating with other computer systems.

Some embodiments operate in a "cloud" computing environment and/or a "cloud" storage environment in which computing services are not owned but are provided on demand. For example, composite review modules 202 may be on multiple devices/systems 102 in a networked cloud, source reviews 128 may be stored on yet other devices within the cloud, and the composite review(s) 204 may configure the display(s) on yet other cloud device(s)/system(s) 102.

Processes

FIG. 3 illustrates some process embodiments in a flowchart 300. Processes shown in the Figures may be performed in some embodiments automatically, e.g., by an aggregating module 210 driven as an automatic side-effect of web searches to produce a composite review 204 from reviews 128 that are responsive to a given web search, or otherwise by processes requiring little or no contemporaneous direct user input. Processes may also be performed in part automatically and in part manually unless otherwise indicated. In a given embodiment zero or more illustrated steps of a process may be repeated, perhaps with different parameters or data to operate on. Steps in an embodiment may also be done in a different order than the top-to-bottom order that is laid out in FIG. 3. Steps may be performed serially, in a partially overlapping manner, or fully in parallel. The order in which flowchart 300 is traversed to indicate the steps performed during a process may vary from one performance of the process to another performance of the process. The flowchart traversal order may also vary from one process embodiment to another process embodiment. Steps may also be omitted, combined, renamed, regrouped, or otherwise depart from the illustrated flow, provided that the process performed is operable and conforms to at least one claim.

Examples are provided herein to help illustrate aspects of the technology, but the examples given within this document do not describe all possible embodiments. Embodiments are not limited to the specific implementations, arrangements, displays, features, approaches, or scenarios provided herein. A given embodiment may include additional or different features, mechanisms, and/or data structures, for instance, and may otherwise depart from the examples provided herein.

During a reviews accessing step 302, an embodiment accesses a collection 304 of source reviews 128. Step 302 may be accomplished using keyword searches, database query languages, and/or other mechanisms, for example.

During a reviews scanning step 306, an embodiment scans reviews 128. Targets sought by the scanning 306 may include lively phrases 310, informative phrases 310, and/or representative phrases 310, for example. Scanning may be accomplished using lexical analysis (e.g., tokenization), parsing to identify phrases based on punctuation and connector words, and other natural language scanning operations, for example.

During a phrase selecting step 308, also referred to as a phrase extracting step 308, one or more phrases 310 are selected by being extracted from source review(s) 128. Phrase extraction may include review scanning 306 in some embodiments. Phrases are selected 308 on the basis of specified criteria that define phrase qualities such as liveliness, informativity, and representativeness. Once the required quality(ies) are found to exist within a candidate phrase (based e.g., on scores from modules 212-216), the candidate phrase is selected. In general, the scanned reviews 128 will contain many more phrases than the phrases 310 that are extracted. Phrases that have the target quality(ies) may remain unselected, due to size limitations on the composite review 204, time constraints for preparing the composite review, or other factors.

During a phrase aggregating step 312, an embodiment aggregates selected phrases into one or more sentences 314. If multiple sentences are created, step 312 may also include aggregating the sentences into a composite review, e.g., by placing 316 the sentences in sequence based on the liveliness, representativeness, informativity, etc. of their component phrases—most lively sentence first, or most lively and informative sentence first, and so on, depending on the embodiment. If the composite review contains only a single sentence 314, then the phrase aggregating step 312 effectively also places 316 the resulting sentence to form the composite review 204.

During a star rating deriving step 318, a star rating 320 for a phrase 310 is computationally derived. The star rating may be derived 318, e.g., by assigning weights to the emotional sentiment value of words in the phrase, (e.g., using a dictionary 350 of affect in language) and then combining those weights, in a manner similar to the way ratings of individual reviews are combined to obtain an overall rating for a review product. Phrase star ratings may be normalized to the scale used in review ratings.

For example, suppose a phrase contains two words of emotional sentiment weight −1 each and four words of emotional sentiment weights 1, 1, 1, and 2, respectively. Then the overall raw rating of the phrase is −1+−1+1+1+1+2=3. Suppose the range of sentiment weights is −2 to 2, so the range of possible weights with six words is −12 to 12. Then 3 corresponds to a value 15/24ths along the way from the worst possible value to the best possible value, that is, 5/8ths on a normalized scale from zero to one, or 62.5%. Normalizing to a review rating between zero and five stars, the closest rating would be three stars out of five (60%). Of course, this set of calculations is only one example. Phrase sentiment weights can be assigned in other ways, and normalized to review ratings in other ways.

During a representativeness definitions meeting step 322, an embodiment determines that a phrase meets specified representativeness definitions 324. Step 322 may be performed by a representativeness scoring module 216, based on the definitions 324 embedded in or referenced by that module 216 for the embodiment in question.

During a coherence conditions satisfying step 326, an embodiment determines that a sentence 314 (completed or under construction) meets specified coherence conditions 328. Step 326 may be performed by a sentence coherence module 206, based on the conditions 328 embedded in or referenced by that module 206 for the embodiment in question.

During a liveliness conditions satisfying step 330, an embodiment determines that a phrase 310 meets specified liveliness conditions 332. Step 330 may be performed by a liveliness scoring module 212, based on the conditions 332 embedded in or referenced by that module 212 for the embodiment in question.

During an informativity conditions satisfying step 334, an embodiment determines that a phrase 310 meets specified informativity conditions 336. Step 334 may be performed by an informativity scoring module 214, based on the conditions 336 embedded in or referenced by that module 214 for the embodiment in question.

During a review distributing step 338, an embodiment distributes a composite review 204 by sending at least one copy over a network 108. Reviews 204 may be created and distributed, e.g., in response to a web search on the reviewed product.

During an automated repeating step 340, an embodiment repeats one or more of steps 302, 306, 308, 312, 316, 318, 322, 326, 330, 334, 344, 348, 354 at automation-only rate(s), that is, with such speed that a person or group of cooperating persons using only non-computerized tools could not realistically perform the same steps to obtain the same results within a substantially equivalent (e.g., within five percent) short period of time.

During a composite review creating step 342, an embodiment computationally creates a composite review 204, by performing step(s) 302, 306, 308, 312, 316, 318, 322, 326, 330, 334, 348, and/or 354. Step 340 may also be part of step 342.

During a filtering step 344, an embodiment filters out prohibited language 346, thereby excluding that language from use in a composite review 204. In some embodiments, phrases 310 from which prohibited language 346 has been redacted can still be used in the composite review, but in other embodiments, the presence of any prohibited language 346 in a phrase prevents any use of that phrase in the composite review 204, even in redacted form.

During a dictionary accessing step 348, an embodiment computationally accesses a digitized sentiment or affect lexicon, such as a dictionary 350 of affect in language.

During a limiting step 354, which is an optional part of aggregating step 312, an embodiment limits the use of phrase connecting words 356 based on the sentiment polarity 358 of the phrases 310 being aggregated with the connecting words.

During a memory configuring step 360, a memory medium 112 is configured by composite review modules 202, by a multiphrase composite review 204, and/or otherwise in connection with a composite review creations as discussed herein.

The foregoing steps and their interrelationships are discussed in greater detail below, in connection with various embodiments.

Some embodiments provide an automated process which computationally analyzes dozens or hundreds of product reviews to create a multiphrase composite product review containing selected extracts. The composite review is created without requiring any selection of review extracts by human reader(s). The automated process makes possible a uniformity of extract selection, a breadth and promptness of composite review distribution, and a rapidity and reliability of composite review creation which are not feasible by human mental steps alone.

In some embodiments, the process includes electronically accessing 302 a source collection 304 of product reviews 128. Each product review 128 of interest contains at least a digital text 130 reciting a reviewer's impressions; reviews may also contain images, video clips, sound clips, and/or other digital data. The process also includes automatically selecting 308 representative phrases 310 from the digital texts of at least some of the product reviews.

What counts as "representative" depends on the embodiment, but is at least capable of automated determination—human mental steps are not required to determine whether a phrase is representative. In some embodiments, each representative phrase is an "extract of" (that is, comes from) at least one of the product reviews' digital text. In some, a phrase is by definition deemed to be a representative phrase when the phrase comes from a product review which has a star rating 320 within thirty percent of an overall star rating 320 of the source collection 304. In some, a phrase is by definition deemed to be a representative phrase when a star rating 320 of the phrase (derived from a balance between positive and negative sentiments in the phrase) is within thirty percent of a star rating 320 of the product review the phrase comes from. In some, phrases in the composite product review are by definition deemed to be representative phrases when a balance between positive and negative sentiments in the composite product review is within thirty percent of a balance between positive and negative sentiments in the source collection. The foregoing definitions are nonexclusive (more than one may be applied at a given time, depending on the embodiment and the data). Also, any one of the definitions is sufficient for a phrase to be deemed representative, in some embodiment.

In some embodiments, the process also includes automatically aggregating 312 at least some of the selected representative phrases into one or more coherent sentences 314, thereby creating the multiphrase composite product review 204.

In some embodiments, the multiphrase composite product review is brief in that the length in words of the multiphrase composite product review is no more than one half of the combined lengths of the digital texts of the product reviews from which the representative phrases were extracted. Other brevity conditions may be applied in other embodiments, e.g., a maximum word count (50, 100, 150, . . . ) or character count (250, 500, . . . ) for the composite review, independent of the lengths of the source reviews, may be imposed.

In some embodiments, a sentence 314 in the multiphrase composite product review created in the aggregating step is "coherent" in that at least a specified number (one, two, three, . . . ) and/or particular specified conditions 328 of the following sentence coherence conditions 328 is/are satisfied 326: the sentence 314 is syntactically well-formed, as determined by a natural language parser; all extracted phrases 310 in the sentence 314 are syntactically congruent with one another, namely, they have the same or compatible phrase types as determined by a natural language parser; the sentence 314 contains no pronouns; the extracted phrases 310 in the sentence have no shared vocabulary of nouns, verbs, adjectives, or adverbs with one another; the extracted phrases 310 in the sentence have none of the following connectors: "but", "although", "however", "except", "also", "in addition", "moreover", "if" (the sentence overall may contain these or other connectors to connect the extracted phrases); the sentence 314 connects phrases 310 of opposing polarity only with a connection phrase that contains at least one of the following connectors: "but", "although", "however", "except"; the sentence 314 connects phrases of non-opposing polarity only with a comma or with a connection phrase that contains at least one of the following connectors: "also", "in addition", "moreover", "and". Phrase "polarity" is determined by the sum of positive/negative sentiment values of the words in the phrase, as indicated, e.g., in a dictionary of affect.

In some embodiments, at least one automatically selected 308 representative phrase comes from a product review which has a star rating within thirty percent of an overall star rating of the source collection. In some, at least one (same or other) automatically selected representative phrase has a derived 318 star rating 320 within thirty percent (for instance) of a star rating of the product review the phrase comes from.

In some embodiments, at least a specified number (one, two, three, . . . ) of the selected (possibly representative) phrases 310 in the multiphrase composite product review 204 are also each a lively phrase 310. A phrase 310 is deemed lively when at least a specified number (one, two, three, . . . ) and/or particular specified conditions 332 of the following phrase liveliness conditions 332 is/are satisfied: the phrase 310 contains at least one superlative word; the phrase 310 contains at least one comparative word; the phrase 310 contains at least one degree modifier word; the phrase 310 contains a sentiment expression having a frequency in the bottom twenty percent (for instance) of a frequency table which lists relative frequency for at least one hundred (for instance) sentiment expressions; at least one word in the phrase 310 has an above-average imagery score based on a dictionary of affect in language; at least one (for instance) word in the phrase 310 has an above-average activation score based on a dictionary of affect in language; the phrase 310 contains at least two (for instance) non-neutral sentiment words; at least one-third (for instance) of the words in the phrase 310 are non-neutral sentiment words.

In some embodiments, the process includes automatically scanning 306 at least twenty (for instance, or another multiple of ten or of a hundred) product reviews. In some, the process includes electronically distributing 338 the multiphrase composite product review 204 over a computer network after the aggregating step 312. In some, the process performs the scanning 306, selecting 308, aggregating 312, and (optionally) distributing 338 steps within less than three minutes, for instance, or within less than five minutes, or some other specified threshold that is beyond mere human performance capabilities for the given situation.

In some embodiments, the process repeats at least one thousand times, thereby creating at least one thousand multiphrase composite product reviews, within less than ten hours. Other thresholds beyond mere human capabilities may be specified in other embodiments.

In some embodiments, at least two (for instance) of the selected representative phrases in the multiphrase composite product review is each also an informative phrase, and a phrase 310 is deemed informative when at least a specified number (one, two, three, . . . ) and/or particular specified conditions 336 of the following phrase informativity conditions 336 is/are satisfied: the phrase 310 contains at least two (for instance) product words from a list of product words for a product category containing the product review; the phrase 310 comes from a review which is no more than two weeks (for instance) old; the phrase 310 comes from a review whose length is within one standard deviation of the mean length of the product reviews in the source collection; the phrase 310 comes from a review which has previously been identified by a human reader as a helpful review.

Some embodiments provide an automated process for creating a multiphrase composite product review 204, with the process including electronically accessing 302 a source collection of product reviews, each product review containing at least a digital text; automatically scanning 306 at least ten (for instance) product reviews 128 for a reviewed product; automatically selecting 308 phrases 310 from the digital texts of at least some of the scanned product reviews, with each selected phrase having at least one of the following phrase qualities: representativeness, liveliness, informativity; automatically aggregating 312 at least two (or three, four, etc.) of the selected phrases into a coherent sentence; automatically placing 316 the coherent sentence as part of a multiphrase composite product review 204; and then automatically distributing 338 the multiphrase composite product review over a computer network.

In some embodiments, the accessing, scanning, selecting, aggregating, and placing steps are performed within less than one minute.

In some embodiments, at least two coherent sentences 314 are automatically placed in the multiphrase composite product review, and each coherent sentence contains at least two automatically selected phrases.

In some embodiments, the multiphrase composite product review includes at least a first phrase having the representativeness quality, at least a second phrase having the liveliness quality, and at least a third phrase having the informativity quality.

In some embodiments, a process repeats 340 at least one hundred times for at least one hundred different reviewed products, thereby creating 342 at least one hundred different multiphrase composite product reviews, within less than one hour.

In some embodiments, a process includes filtering out 344 prohibited language 346 such that prohibited language appearing in a scanned product review 128 does not appear in the multiphrase composite product review 204.

Figure 4:
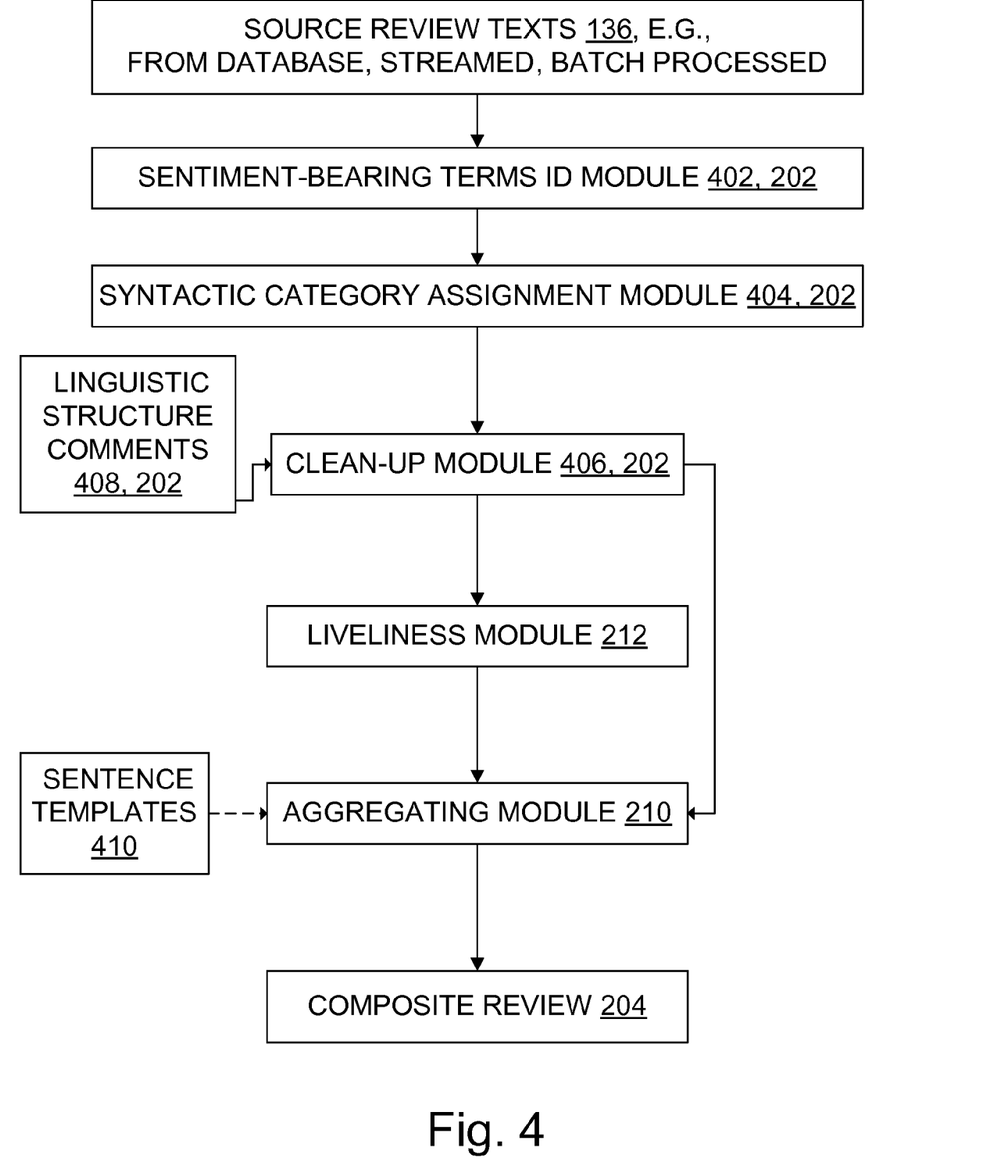
FIG. 4 is a data flow diagram further illustrating aspects of composite review generation in another example architecture.

FIG. 4 illustrates a data flow used in some embodiments. Other data flows are used in other embodiments. Reviews 128 reside in a source collection 304 which has one or more component sub-collections such as a database, a streamed collection, and/or a batch-processed dataset.

A sentiment module 402 identifies sentiment-bearing terms, e.g., by scanning for terms that appear in a dictionary of affect. Sentiment module 402 may be part of a product review module 208 or part of a liveliness scoring module 212, or may reside elsewhere in composite review modules 202 logic, in a given embodiment.

A syntactic category assignment module 404 assigns scanned terms or phrases to syntactic categories, e.g., noun-phrase, adjective, and so on, using familiar natural language processing mechanisms. Syntactic category module 404 may be part of a sentence coherence module 206 or part of an aggregating module 210, or may reside elsewhere in composite review modules 202 logic, in a given embodiment.

A clean-up module 406 eliminates phrases or phrase snippets that contain undesired or prohibited language such as pronouns, profanity, and so on. Reviewer comments (phrases 310) annotated with linguistic structural information (e.g., sentiment weights, syntactic category) may be maintained in a module 408, with data generated by other modules 202 and fed to the clean-up module 406. Modules 406, 498 may be part of an aggregating module 210, or may reside elsewhere in composite review modules 202 logic, in a given embodiment.

In some embodiments, a templates module 410 includes a set of templates with slots marked for matching phrases in a database of sentiment bearing comments, as maintained in linguistic structure comments module 408, for example.

Some embodiments utilize mechanisms for phrase selection 308, sentiment term identification and categorization, phrase polarity determination, phrase scoring and/or other phrase-processing aspects which are disclosed in one or both of the following applications, each of which is hereby incorporated by reference: US patent application publication no. 2007/0282867 of Dec. 6, 2007 by McAllister et al., US patent application publication no. 2008/0215571 of Sep. 4, 2008 by Huang et al.

Configured Media

Some embodiments include a configured computer-readable storage medium 112. Storage medium 112 may include disks (magnetic, optical, or otherwise), RAM, EEPROMS or other ROMs, and/or other configurable memory devices, as opposed to wires and other propagated signal media. The storage medium which is configured may be in particular a removable storage medium 114 such as a CD, DVD, or flash memory. A general-purpose memory, which may be removable or not, and may be volatile or not, can be configured into an embodiment using items such as composite review module(s) 202 and multiphrase composite reviews 204, in the form of data 118 and instructions 116, read from a removable medium 114 and/or another source such as a network connection, to form a configured storage medium. The configured storage medium 112 is capable of causing a computer system to perform process steps for transforming source review data through selection 308 and aggregation 312 as disclosed herein. FIGS. 1 through 4 thus help illustrate configured storage media embodiments and process embodiments, as well as system and process embodiments. In particular, any of the process steps illustrated in FIG. 3 and/or FIG. 4, or otherwise taught herein, may be used to help configure a storage medium to form a configured storage medium embodiment.

Additional Examples

Additional details and design considerations are provided below. As with the other examples herein, the features described may be used individually and/or in combination, or not at all, in a given embodiment.

Those of skill will understand that implementation details may pertain to specific code, such as specific APIs and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, these details are provided because they may help some readers by providing context and/or may illustrate a few of the many possible implementations of the technology discussed herein.

The following discussion is derived from Composite Review Generation Project documentation. Composite Review Generation Project (CRGP) is a project implemented by Microsoft® Corporation (mark of Microsoft Corporation). Aspects of CRGP methodology, software, data structures, and/or documentation are consistent with or otherwise illustrate aspects of the embodiments described herein. However, it will be understood that CRGP documentation and/or implementation choices do not necessarily constrain the scope of such embodiments, and likewise that CRGP and/or its documentation may well contain features that lie outside the scope of such embodiments. It will also be understood that the discussion below is provided in part as an aid to readers who are not necessarily of ordinary skill in the art, and thus may contain and/or omit details whose recitation below is not strictly required to support the present disclosure. Finally, differences in capitalization do not necessarily imply different components, e.g., a "Roles" component and a "roles" component may be the same item, or different items, or the same in some embodiments and different in others, according to context as understood by one of skill.

As a workflow overview, CRGP included a Search Labs workflow, and a Powerset Natural Language (NL) Processing Environment workflow. The type of "search" in question is searching online using a search engine, such as any of the familiar web browser-accessible search engines. The Search Lab is a group within Microsoft that develops search engine and related technology. Powerset is a group within Microsoft that develops semantic natural language processing to improve web searches, and related technology.

In the Search Labs workflow, product reviews 128 flow to a data cleanup component, e.g., a module 406. From there, data flows to a Powerset NL processing cluster, specifically, an HBase repository. HBase is a non-relational distributed database. Also present in the cluster are an XLE/Transfer component for lexical analysis, and an "Oceanography" component. Oceanography is a corpus analysis system developed by the Powerset group.

From the Powerset cluster, workflow returns to the Search Labs, specifically to a post-processing component, followed by a composite review scoring component, which feeds in turn to a composite review mixer and a composite review database. A sentiment service component also feeds the composite review mixer and the composite review database, and is fed by experimental search engine clients.

In considering the workflow, it may helpful to note that human speakers use language to express their attitudes towards content they are talking about, e.g., in reviews 128. An automated system may use connotative dimensions of lexical items together with other methods to express those attitudes. Lexical items may convey positive or negative connotations, "tyke" vs. "brat" vs. "kid". The positive, negative or neutral connotation of a specific sense of a lexical item in a specific domain is called its "sentiment".

With regard to sentiment terms, and specifically lexical items, almost any open class item can carry sentiment. Some examples are Verbs (despise, admire), Nouns (happiness, puppy, sympathy), Proper Nouns (Hitler, Ghandi), Adjectives (cuddly, sweet (in many contexts)), Adverbs (gently, tenderly), and multiword expressions (Fly off the handle, beat around the bush). Some examples of related Expressives include Epithets (jerk), expressive attributive adjectives (damn), Honorifics (Your Highness), and Diminutive particles (chico—chiquito).

Inferring sentiment can be difficult. Different words may have the same string but different sentiment, e.g., "content$^{(+)}$ citizens" vs. "content$^{(N)}$ of the book", which illustrate a positive and a neutral sentiment, respectively. One may encounter different senses of same word with different sentiment, e.g., beat$^{(N)}$ the drum vs. "beat$^{(-)}$ the donkey", or the same word/different part of speech with different sentiment, e.g., "terrible$^{(-)}$ [ADJ] cook" vs. "terribly [ADV] proud"(++), or in a different domain encounter the same word with a different sentiment "tight$^{(-)}$ fitting shoes" vs. "tight$^{(+)}$ fitting lens cap", or in a different sub-domain the same word but different sentiment, e.g., digital camera: "high$^{(+)}$ resolution" vs. "high$^{(-)}$ cost. Moreover, synonyms may differ in sentiment, e.g., "brat"$^{(-)}$, "kid"$^{(N)}$. Antonyms may have the same sentiment, e.g., "frigid weather"$^{(-)}$ vs. "sweltering weather"$^{(-)}$. Not all negative adjectives can be intensifiers: "terrible/terribly (++pretty)" vs "miserable/*miserably happy. Some "bad" words/concepts can be neutral, e.g., "cancer" in a medical text is neutral.

Various Sentiment Lexica are available, including computational sentiment lexicon development efforts such as General Inquirer (Harvard), SentiWordNet. Also available or reasonably easy to create are hand crafted lexica. Powerset's Sentimenticon has "no brainer" words: NEG/POS in all domains and POS (despicable, delightful). One may add sentiment marking to a lexical entry, and may use machine learning to generate lexica. In CGRP, from 36,000+ raw entries, a master lexicon with 15,900+ unique sentiment entries was compiled, including typical sentiment word lists, sentiment frames, and psychological affective word lists, collected from public domain resources (general purpose), internal Microsoft resources (general purpose, cameras), and by additional manual mining from camera reviews and dictionaries/thesauri.

Some other examples of lexica which may be suitable for use in a dictionary of affect, or in generating a suitable dictionary 350 of affect, include valence shifters, degree modifiers, MPQA, General Inquirer, and others. Information about these resources is readily available by web search. In particular, Whissell's Dictionary of Affect in Language includes 8700+ words rated by 200 annotators along three core affect dimensions: EVALUATION (scored as (1) Unpleasant (2) In between (3) Pleasant), ACTIVITY (scored as (1) Passive (2) In between (3) Active) and IMAGERY (scored as (1) Hard to imagine (2) In between (3) Easy to imagine).

With regard to the particular architecture of CGRP, an NL-pipeline data flow is as follows: {probabilistic nametagger, FST nametagger}→tokenizer→morphology→parser→most probable selection→semantics→{XML index encoding, Query Execution Language}, with Lexical resources→(the same) parser and also Lexical/knowledge resources→(the same) semantics. A Transfer data flow includes Semantic Normalization→Lexical Expansion→roles→Coreference Resolution→Powerset specific reformulation→Semantic/index Expansion→semreps, with Lexicon (WordNet++)→(the same) Lexical Expansion, and Unified Lexicon→roles, and Coreference Resolution→previous states→Coreference Resolution.

In an Index_seq workflow, components are the same as listed above for the Transfer data flow, with specific implementation rules named, e.g., "pre_proc_rules" and "fs_sem_rules" for Semantic Normalization, and so on. Lexical Expansion has "sense" and "derivation" rules, Coreference Resolution has "gen_prag" and "index_prag" rules, Powerset specific reformulation has "gen_reform" rules, and Semantic/index Expansion has "index_reform" rules. An Index_sentiment_seq data flow further refines the Index_seq workflow by adding a Sentiment Lexicon (e.g., bad, clunker, good, success), a Sentiment Frames (e.g., bad (-), whine (-,-), complain (N,-), be (=,=)), and a Degree Modifiers (e.g., really, a bit) component, each feeding into a Sentiment Lexical Rules located between the Lexical Expansion component and the roles component. Also, Additional Sentiment Rules, e.g., to reform, are added after the Semantic/index Expansion component.

As a specific CRGP example, processing of the phrase "XYZ makes a bad camera" involves operations such as:

```
word_hash(bad:n(15, 0), sentiment, [bad, adj, −1, 1, [source(lexicon)]])
word_hash(bad:n(15, 0), sentiment, [bad, amod, −1, 1, [source(assigns)]])
word_hash(camera:n(19, 0), sentiment, [camera, noun, −1, 1,
[source(modifier(bad:n(15, 0)))]])
```

As another specific CRGP example, processing of the phrase "XYZ doesn't make a bad camera" involves operations such as:

```
word_hash(bad:n(15, 0), sentiment, [bad, adj, −1, 1, [source(lexicon)]])
word_hash(bad:n(15, 0), sentiment, [bad, amod, −1, 1,
[source(assigns)]])
word_hash(bad:n(22, 0), sentiment, [bad, adj, 1, 1, [special(negated),
source(lexicon)]])
word_hash(bad:n(22, 0), sentiment, [bad, amod, 1, 1, [special(negated),
source(assigns)]])
word_hash(camera:n(26, 0), sentiment, [camera, noun, 1, 1,
[special(negated), source(modifier(bad:n(22, 0)))]])
```

As another specific CRGP example, processing of the phrase "XYZ's perfectly designed cameras are available on Tuesday" involves operations such as:

```
word_hash(perfectly:n(9, 0), modify_degree, [perfectly, adv, 5])
word_hash(perfectly:n(9, 0), sentiment, [perfectly, adv, 1, 1,
[source(assigns)]])
word_hash(perfectly:n(9, 0), sentiment, [perfectly, amod, 1, 1,
[source(assigns)]])
word_hash(design:n(19, 0), sentiment, [design, verb, 1, 5,
[strengthened_by(perfectly:n(9, 0)), source(modifier(perfectly:n(9, 0)))]])
```

As another specific CRGP example, processing of the phrase "This camera is a bad one" involves operations such as:

```
word_hash(bad:n(18, 0), sentiment, [bad, adj, −1, 1, [source(lexicon)]])
word_hash(bad:n(18, 0), sentiment, [bad, amod, −1, 1, [source(assigns)]])
word_hash(camera:n(6, 0), sentiment, [camera, noun, −1, 1,
[source(other_verb_arg(identical_to)), source(modifier(bad:n(18, 0)))]])
word_hash(one:n(22, 0), sentiment, [one, noun, −1, 1,
[source(modifier(bad:n(18, 0)))]])
```

As another specific CRGP example, processing of the phrase "/tried this camera but it is bad" involves operations such as:

```
word_hash(bad:n(18, 0), sentiment, [bad, adj, −1, 1, [source(lexicon)]])
word_hash(bad:n(18, 0), sentiment, [bad, amod, −1, 1, [source(assigns)]])
```

```
word_hash(camera:n(14, 0), sentiment, [it, noun, −1, 1,
[source(pronoun(it:n(25, 0))), source(modifier(bad:n(31, 0)))]])
```

As a final specific CRGP example, processing of the phrase "John says this camera is bad." involves operations such as:

```
word_hash(bad:n(18, 0), sentiment, [bad, adj, −1, 1, [source(lexicon)]])
word_hash(bad:n(18, 0), sentiment, [bad, amod, −1, 1, [source(assigns)]])
word_hash(camera:n(16, 0), sentiment, [camera, noun, −1, 1,
[opined_by(john:n(1, 0)), speech(say:n(6, 0)),
source(modifier(bad:n(26, 0)))]])
```

With regard to CRGP and Sentiment Mining with Oceanography, product and review IDs were added to semreps using state facts, and one could extract sentiment relations, fspans, phrases, and sentences, e.g., with a flow of operations like the following:

```
cf(1, word_hash(easy:n(51,5),sentiment,[easy,adj,1,1,[source(lexicon)]])) −>
cf(1,in_context(t,role(hier(amod,[[amod,how,root]]),program:n(7,5),easy:n(51,5))))
, −>
{ cf(1, fspan(program:n(7,5),1,15)), cf(1, fspan(easy:n(51,5),51,55)),} −>
string('These programs are all really good fun to use and easy to
understand. ...'),
```

Oceanography Post-processing was used to transform, filter, and score mined sentiment-bearing semantic relations, using structures such as the following:

```
<Phrase ID="3">
    <ProductID>111BCE1E841C5576E27B</ProductID>
    <ReviewID>463</ReviewID>
    <ReviewShingle>0x01 0x12 0x7E 0xAC 0x60 0x2C 0x5B 0x93
0xA6 0x1B</ReviewShingle>
    <Sentiment>POS</Sentiment>
    <Type>NP</Type>
    <Liveliness>0.571428571428571</Liveliness>
    <ProductStars>5</ProductStars>
    <ReviewStars>4</ReviewStars>
    <SelectionScore>0.78</SelectionScore>
    <Text><![CDATA[great creative photos]]></Text>
    <Sentence><![CDATA[Lot of experimenting and great creative
photos can be powered with it.]]></Sentence>
</Phrase>
```

With regard to Composite Review Generation, a target was to generate natural sentiment-bearing composite review snippets that read well, e,g, by steps such as filtering and ranking raw source phrases based on selection fitness scores, and generating snippets from templates filled with top-scoring phrases. Some approaches favored phrases that contain product (camera product in CRGP) terms (RELEVANCE), are lively and opinionated (LIVELINESS), reflect the overall product stars (VOX POPULI), come from helpful reviews (CREDIBILITY), and are recent (RECENCY).

As to Source Phrase Scoring and Ranking, one data flow includes Oceanography Extractions→Camera Term Filter (relevance)→{Indicator Test (liveliness scoring), Sentiment-rating distance (Product Star Rating Alignment), Helpfulness Classifier (Review Helpfulness Alignment), Time span Filter (Recency Alignment)}→{Source Phrase Database, Composite Review Mixer}. The Relevance Filter provides a hard constraint to discard source phrases that do not contain explicit product terms based on a white list of 211 core camera terms. Liveliness Scoring favors subjective language (lively, buzzy, flowery, . . . ), and uses a simple binary classifier society of weighted heuristic indicator tests with lively-unlively thresholds with simple voting across the indicator tests-unlively votes are suppressed.

HELPFUL reviews give enough objective information, explain the author's positive or negative experiences and opinions in a way that is useful for other shoppers, are grammatical, well-written, and feel credible, are not too personal, and are neither too long nor too short.

The CRGP Composite Review Mixer uses 'fit' source phrases to generate composite review snippets. Simple NLG templates have polarity slots (up to 3) filled with source phrases with selection fitness scores above some threshold, with connectors between slots (but also and although–, . . . ). Random template selection is used. Simple content filters are used to avoid repetitive content, pronouns, and connectors. Syntactic congruency across slots is favored. Polarity is considered when connecting phrases, e.g., the phrase "ridiculously powerful zoom" but "skin tones not so good" uses "but" to connect a positive-polarity phrase with a subsequent negative-polarity phrase.

CONCLUSION

Although particular embodiments are expressly illustrated and described herein as processes, as configured media, or as systems, it will be appreciated that discussion of one type of embodiment also generally extends to other embodiment types. For instance, the descriptions of processes in connection with FIGS. 3 and 4 and the dataflow examples also help describe configured media, and help describe the operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific features of an example may be omitted, renamed, grouped differently, repeated, instantiated in hardware and/or software differently, or be a mix of features appearing in two or more of the examples. Functionality shown at one location may also be provided at a different location in some embodiments.

Reference has been made to the figures throughout by reference numerals. Any apparent inconsistencies in the phrasing associated with a given reference numeral, in the figures or in the text, should be understood as simply broadening the scope of what is referenced by that numeral.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims and the abstract, as filed, are part of the specification.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific features or acts described above the claims. It is not necessary for every means or aspect identified in a given definition or example to be present or to be utilized in every embodiment. Rather, the specific features and acts described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. An automated process comprising the steps of:
electronically accessing a source collection of product reviews, each product review containing at least a digital text;
automatically selecting representative phrases from the digital texts of at least some of the product reviews, each representative phrase being an extract of at least one of the product reviews' digital text, wherein at least one of the following criteria is also satisfied: (a) the representative phrase comes from a product review which has a star rating within thirty percent of an overall star rating of the source collection, (b) a star rating of the representative phrase, which is derived from a balance between positive and negative sentiments in the representative phrase, is within thirty percent of a star rating of the product review the representative phrase comes from, or (c) a balance between positive and negative sentiments in the composite product review is within thirty percent of a balance between positive and negative sentiments in the source collection of product reviews from which the representative phrase was extracted; and
automatically aggregating at least some of the selected representative phrases into one or more coherent sentences, thereby creating a multiphrase composite product review, wherein the multiphrase composite product review is brief in that the length in words of the multiphrase composite product review is no more than one half of the combined lengths of the digital texts of the product reviews from which the representative phrases were extracted;
wherein the process computationally analyzes product reviews to create the multiphrase composite product review containing selected extracts without requiring any selection of review extracts by human reader(s), thereby making possible a uniformity of extract selection, a breadth and promptness of composite review distribution, and a rapidity and reliability of composite review creation which are not feasible by mental steps alone.

2. The automated process of claim 1, wherein a sentence in the multiphrase composite product review created in the aggregating step is coherent in that at least two of the following sentence coherence conditions is satisfied:

the sentence is syntactically well-formed, as determined by a natural language parser;

all extracted phrases in the sentence are syntactically congruent with one another, namely, they have the same or compatible phrase types as determined by a natural language parser;

the sentence contains no pronouns;

the extracted phrases in the sentence have no shared vocabulary of nouns, verbs, adjectives, or adverbs with one another;

the extracted phrases in the sentence have none of the following connectors: "but", "although", "however", "except", "also", "in addition", "moreover", "if" (the sentence overall may contain these or other connectors to connect the extracted phrases);

the sentence connects phrases of opposing polarity only with a connection phrase that contains at least one of the following connectors: "but", "although", "however", "except";

the sentence connects phrases of non-opposing polarity only with a comma or with a connection phrase that contains at least one of the following connectors: "also", "in addition", "moreover", "and".

3. The automated process of claim 1, wherein at least one automatically selected representative phrase comes from a product review which has a star rating within thirty percent of an overall star rating of the source collection, and wherein at least one other automatically selected representative phrase has a derived star rating within thirty percent of a star rating of the product review the phrase comes from.

4. The automated process of claim 1, wherein at least two of the selected representative phrases in the multiphrase composite product review are also each a lively phrase, and a phrase is deemed lively when at least one of the following phrase liveliness conditions is satisfied:

the phrase contains at least one superlative word;

the phrase contains at least one comparative word;

the phrase contains at least one degree modifier word;

the phrase contains a sentiment expression having a frequency in the bottom twenty percent of a frequency table which lists relative frequency for at least one hundred sentiment expressions;

at least one word in the phrase has an above-average imagery score based on a dictionary of affect in language;

at least one word in the phrase has an above-average activation score based on a dictionary of affect in language;

the phrase contains at least two non-neutral sentiment words;

at least one-third of the words in the phrase are non-neutral sentiment words.

5. The automated process of claim 1, wherein the process further comprises (a) automatically scanning at least twenty product reviews, and (b) electronically distributing the multiphrase composite product review over a computer network after the aggregating step, and wherein the process performs the scanning, selecting, aggregating, and distributing steps within less than three minutes.

6. The automated process of claim 1, wherein the process repeats at least one thousand times, thereby creating at least one thousand multiphrase composite product reviews, within less than ten hours.

7. The automated process of claim 1, wherein at least two of the selected representative phrases in the multiphrase composite product review is each also an informative phrase, and a phrase is deemed informative when at least one of the following phrase informativity conditions is satisfied:

the phrase contains at least two product words from a list of product words for a product category containing the product review;

the phrase comes from a review which is no more than two weeks old;

the phrase comes from a review whose length is within one standard deviation of the mean length of the product reviews in the source collection;

the phrase comes from a review which has previously been identified by a human reader as a helpful review.

8. A computer-readable storage medium configured with data and with instructions that when executed by at least one processor causes the processor(s) to perform an automated process for creating a multiphrase composite product review, the process comprising the steps of:

electronically accessing a source collection of product reviews, each product review containing at least a digital text;

automatically scanning at least ten product reviews for a reviewed product;

automatically selecting phrases from the digital texts of at least some of the scanned product reviews, each selected phrase having at least one of the following phrase qualities: representativeness, liveliness, informativity;

filtering out prohibited language which appears in a scanned product review, the prohibited language belonging to at least one of the following categories: profanity, sexually explicit language, website addresses, email addresses, celebrity names;

automatically aggregating at least two of the selected phrases into a coherent sentence;

automatically placing the coherent sentence as part of a multiphrase composite product review; and     automatically distributing the multiphrase composite product review over a computer network, the distributed multiphrase composite product review being free of the prohibited language that appeared in the scanned product review.

9. The configured medium of claim 8, wherein the accessing, scanning, selecting, aggregating, and placing steps are performed within less than one minute.

10. The configured medium of claim 8, wherein at least two coherent sentences are automatically placed in the multiphrase composite product review, and each coherent sentence contains at least two automatically selected phrases.

11. The configured medium of claim 8, wherein the multiphrase composite product review includes at least a first phrase having the representativeness quality, at least a second phrase having the liveliness quality, and at least a third phrase having the informativity quality.

12. The configured medium of claim 8, wherein the process repeats at least one hundred times for at least one hundred different reviewed products, thereby creating at least one hundred different multiphrase composite product reviews, within less than one hour.

13. A computer system comprising:

at least one logical processor;

a computer-readable storage medium in operable communication with the logical processor;

composite review modules which include at least the following:

a sentence coherence module residing in the medium and having a set of connector words;

a product review module residing in the medium and having access to a source collection of source reviews containing digital texts;

an aggregating module residing in the medium and having code which upon execution by the logical processor(s) will perform an automated process for creating a multiphrase composite review which contains at least one coherent sentence of connected phrases from the source review texts; and the multiphrase composite review residing in the medium, the composite review containing hyperlinks to source reviews, the multiphrase composite product review also being free of prohibited language that appeared in at least one of the source review texts, the prohibited language belonging to at least one of the following categories: profanity, sexually explicit language, website addresses, email addresses, celebrity names;

wherein each composite review module is operably connected for data transfer to at least one other composite review module.

14. The system of claim 13, wherein the composite review modules further include a sentiment phrase liveliness scoring module residing in the medium and having access to a dictionary of affect in language, wherein the dictionary of affect in language includes imagery scores and activation scores, and wherein the aggregating module operates with the liveliness scoring module to place lively phrases (based on an imagery score, an activation score, or both) in the composite review.

15. The system of claim 13, wherein the composite review modules further include a sentiment phrase informativity scoring module residing in the medium and having a list of informative words, and wherein the aggregating module operates with the informativity scoring module to place informative phrases (based on the informative words) in the composite review.

16. The system of claim 13, wherein the composite review modules further include a sentiment phrase representativeness scoring module residing in the medium and having access to star ratings, and wherein the aggregating module operates with the representativeness scoring module to place representative phrases (based on the star ratings) in the composite review.

17. The system of claim 13, wherein phrases of the multiphrase composite review have a respective polarity, and wherein the connector words include a first list which contains at least the connector words that connect phrases of opposing polarity in the composite review, and the connector words also include a second list which contains at least the connector words that connect phrases of non-opposing polarity in the multiphrase composite review.

18. The system of claim 13, wherein phrases of the multiphrase composite review are extracted from at least six different source reviews, and the source collection contains at least one hundred source reviews.

19. The configured medium of claim 8, wherein a sentence in the multiphrase composite product review created in the aggregating step is coherent in that at least two of the following sentence coherence conditions is satisfied:

the sentence is syntactically well-formed, as determined by a natural language parser;

all extracted phrases in the sentence are syntactically congruent with one another, namely, they have the same or compatible phrase types as determined by a natural language parser;

the sentence contains no pronouns;

the extracted phrases in the sentence have no shared vocabulary of nouns, verbs, adjectives, or adverbs with one another;

the extracted phrases in the sentence have none of the following connectors: "but", "although", "however", "except", "also", "in addition", "moreover", "if" (the sentence overall may contain these or other connectors to connect the extracted phrases);

the sentence connects phrases of opposing polarity only with a connection phrase that contains at least one of the following connectors: "but", "although", "however", "except";

the sentence connects phrases of non-opposing polarity only with a comma or with a connection phrase that contains at least one of the following connectors: "also", "in addition", "moreover", "and".

20. The system of claim 13, wherein each of at least two phrases in the multiphrase composite product review satisfies at least one of the following phrase liveliness conditions:

the phrase contains at least one superlative word;

the phrase contains at least one comparative word;

the phrase contains at least one degree modifier word;

the phrase contains a sentiment expression having a frequency in the bottom twenty percent of a frequency table which lists relative frequency for at least one hundred sentiment expressions;

at least one word in the phrase has an above-average imagery score based on a dictionary of affect in language;

at least one word in the phrase has an above-average activation score based on a dictionary of affect in language;

the phrase contains at least two non-neutral sentiment words;

at least one-third of the words in the phrase are non-neutral sentiment words.

* * * * *